United States Patent [19]

Madsen et al.

[11] Patent Number: 5,446,619
[45] Date of Patent: Aug. 29, 1995

[54] CARD EXTENDER UNIT FOR COMPUTER

[75] Inventors: Roberta M. Madsen, Houston; David A. Moore, Tomball; Brian J. Perona, Houston, all of Tex.

[73] Assignee: Compaq Computer Corp., Houston, Tex.

[21] Appl. No.: 106,051

[22] Filed: Aug. 12, 1993

[51] Int. Cl.⁶ .................................. H05K 7/20
[52] U.S. Cl. ...................... 361/695; 312/223.2; 361/687; 361/796; 364/708.1
[58] Field of Search ................... 361/687–690, 361/692–695, 724, 725, 736, 737, 752, 756, 796, 801; 211/41; 165/80.3; 312/223.2; 364/708.1

[56] References Cited
U.S. PATENT DOCUMENTS

| | | | |
|---|---|---|---|
| 4,149,218 | 4/1979 | Carrubba | 361/383 |
| 4,366,526 | 12/1982 | Litoi | 361/796 |
| 4,744,006 | 5/1988 | Duffield | 361/413 |
| 4,862,327 | 8/1989 | Ansell | 361/415 |
| 4,998,180 | 3/1991 | McAuliffe | 361/383 |
| 5,077,638 | 12/1991 | Andersson | 361/388 |
| 5,208,722 | 5/1993 | Ryan | 360/99.01 |
| 5,210,680 | 5/1993 | Scheibler | 361/384 |

Primary Examiner—Gerald P. Tolin
Attorney, Agent, or Firm—Pravel, Hewitt, Kimball & Krieger

[57] ABSTRACT

A card extender unit for a computer housing including first and second card extender sections which mount the card extender in position in the computer housing. The card extender includes a housing including first and second sections which support a printed circuit board having one or more high wattage, integrated circuits. One of the card extender sections includes a flow direction channel intake for directing air generated by an internal housing fan over one or more of the high wattage, integrated circuits mounted on the printed circuit board.

5 Claims, 2 Drawing Sheets

CARD EXTENDER UNIT FOR COMPUTER

FIELD OF THE INVENTION

This invention relates to an improvement in a card extender unit for mounting in a computer housing.

BACKGROUND OF THE INVENTION

In the manufacture of computers, it is well known to add one or more processor cards to the system board circuitry, depending upon the power of the computer and the particular operations to be performed. Typically, a computer chassis includes an internal shelf structure for mounting one or more processor cards in position for attachment to a system board. In some housings, the distance between the internal housing supports for the processor cards is much wider than the cards and support structure known as card extenders are used to mount the cards. In some applications, the processor cards have high wattage, integrated circuits mounted on the printed circuit board. When high wattage, integrated circuits such as, for example, Pentiums manufactured by Intel Corp., are utilized, heat generation may become a problem.

It is well known to mount one or more fan units as part of a computer housing in order to circulate outside air through the internals of a computer in order to reduce the temperature generated by various components of electronic circuitry. In the situation where processor cards include high wattage, integrated circuits, general fan circulation has been found to be potentially insufficient to cool such high wattage chips.

SUMMARY OF THE INVENTION

It is an object of this invention to provide a card extender which includes a flow channel section for directing circulating air over high wattage, integrated circuits in order to maintain the temperature of the circuits within desirable operating ranges. The card extender of this invention is provided for attachment to the printed circuit board of the processor card and includes a channel section for directing circulating air across such high wattage, integrated circuits mounted on the printed circuit board in order to dissipate operational heat. The card extender unit of this invention includes an extender housing attached to the printed circuit board. The extender housing includes a first section extending into attachment with a support section on the computer housing and a second section extending into attachment with another support section of the computer housing. The second section of the card extender housing includes a channel section for receiving and directing air over one or more of such high wattage, integrated circuits. The channel section includes top, bottom and side walls interconnected to form a flow direction channel. The top of the flow direction channel is, in one embodiment, mounted for pivotal movement to an expanded position in order to enlarge the intake area of the flow direction channel to enhance circulation over the high wattage, integrated circuits.

This description is intended to be a general summary only. The details of the invention will be described with particularity in the Description of the Preferred Embodiment and the scope of patent protection sought and obtained will be set forth in the claims to follow.

DESCRIPTION OF THE PREFERRED EMBODIMENT

Figure 1:
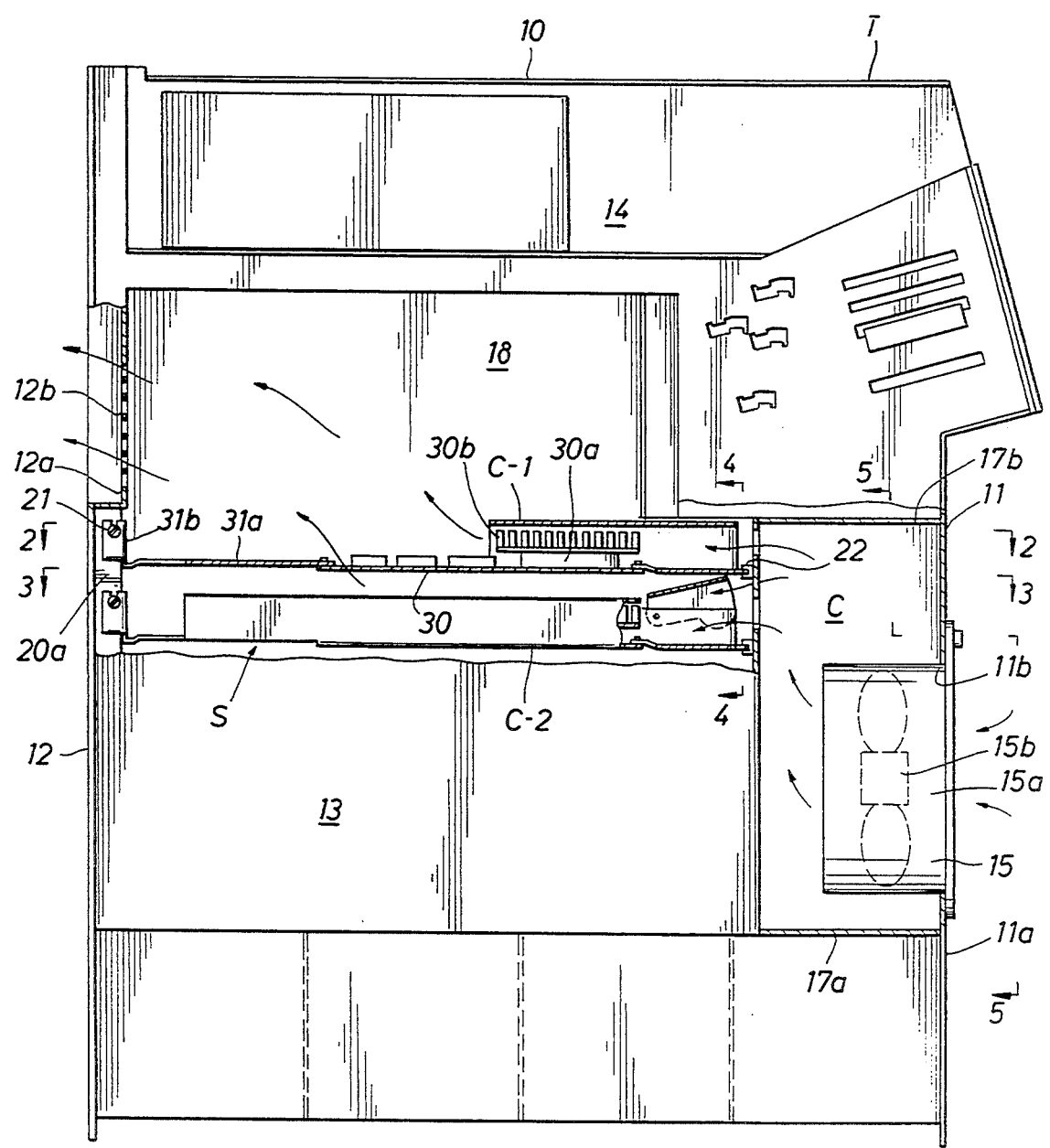
FIG. 1 is a side view partly in section of the card extender units of this invention mounted in the chassis for a tower unit computer housing.

Referring to the drawings, the card extenders C-1 and C-2 of this invention are illustrated in the chassis 10 for the tower computer housing T. The card extenders C-1 and C-2 provide the combined function of mounting printed circuit boards for attachment within the computer chassis 10 and for directing the flow of circulating air across high wattage, integrated circuits mounted on the printed circuit board in order to cool the integrated circuits mounted on the printed circuit boards.

The chassis 10 for the tower computer unit T is illustrated from a side view and partly in section in FIG. 1. Referring to FIG. 1, the tower unit chassis 10 includes a front 11, a rear 12, a first wall section 13 and second wall section 14 which interconnect to form a generally box-like computer chassis. The specific structure for the tower unit chassis 10 illustrated in FIG. 1 is partly described in U.S. Pat. No. 5,208,722, also assigned to Compaq Computer Corporation. The chassis 10 for the tower unit T is typically made of a light weight metal such as aluminum and is made as inexpensively as possible through mass production of stamped parts in a known manner. The front wall 11 of the tower unit chassis 10 includes a generally flat sheet 11a having a circular opening 11b, which opening 11b receives and mounts a circulating fan unit 15. The circulating fan unit 15 is of a standard construction well known in the computer field. The fan includes a circular housing 15a which houses a motor and fan unit illustrated schematically in FIG. 1 and identified as 15b.

The fan unit 15 is mounted in a plenum chamber generally designated as C. The plenum chamber C is internal to the chassis 10 and is formed by a bottom wall 17a, a top wall 17b, side walls 17c and 17d and an internal, rear wall 17e. The internal, rear wall 17e of the plenum chamber C includes a series of openings such as 17f and 17g in order to provide for the circulation of outside air by the fan through the plenum chamber C and into the interior space S of the tower unit chassis 10. The various wall sections which form the plenum chamber C are interconnected by any suitable means in a well known manner. Typical inner connections for such wall sections within a tower unit chassis are made by screws, rivets and the like.

Figure 2:
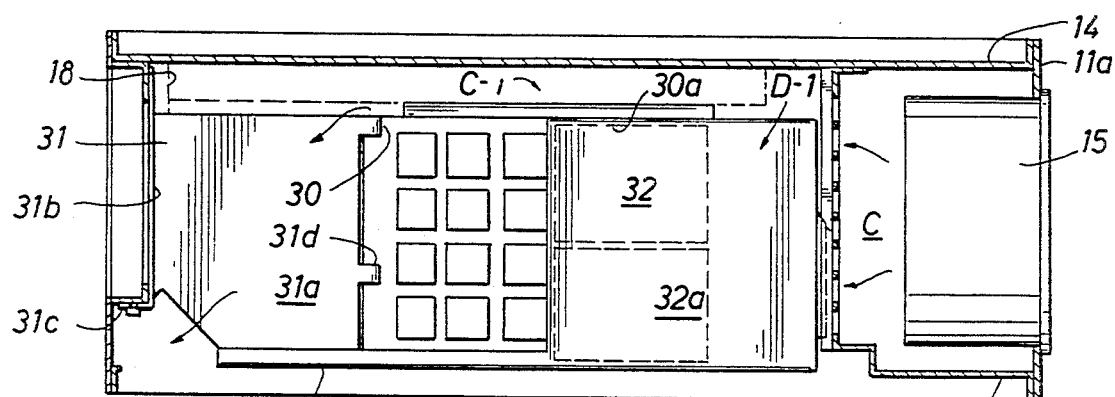
FIG. 2 is a top view of the card extender of a first embodiment of this invention as mounted in the computer chassis, partly in section, taken along line 2—2 of FIG. 1.
Figure 3:
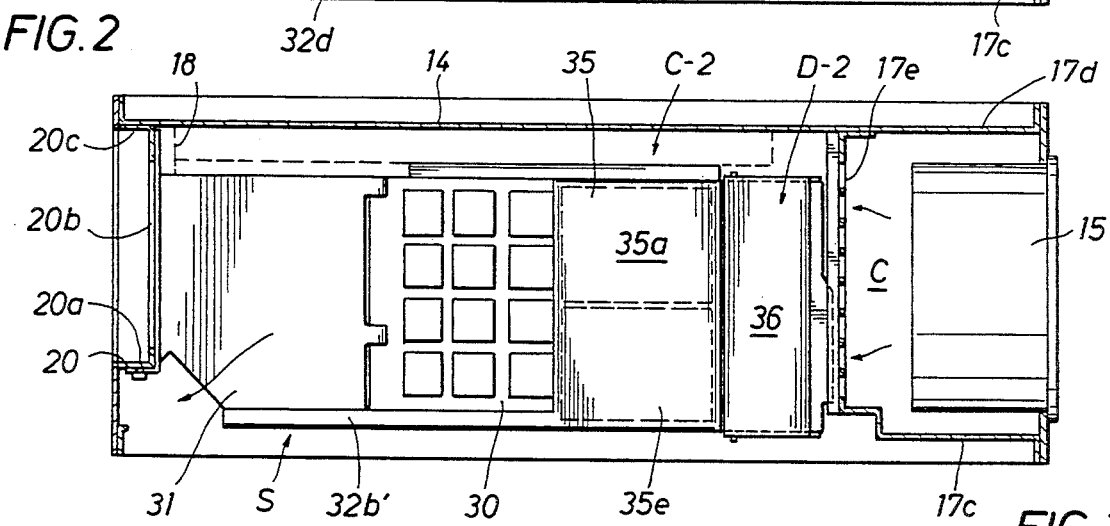
FIG. 3 is a top view of a second embodiment of the card extender of this invention, partly in section, taken along line 3—3 of FIG. 1.
Figure 4:
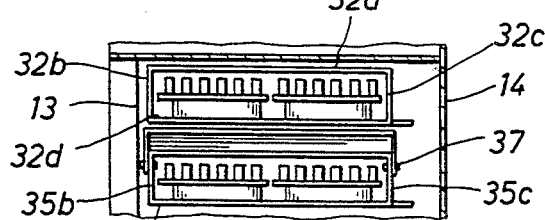
FIG. 4 is an end view of the card extenders of both embodiments of this invention, partly in section, taken along line 4—4 of FIG. 1.
Figure 5:
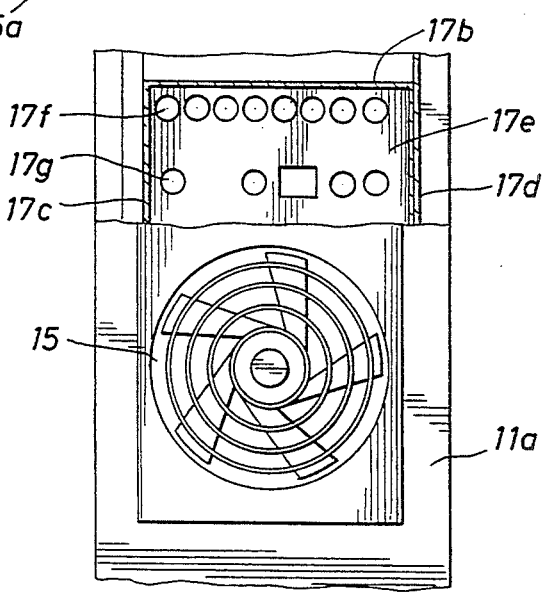
FIG. 5 is a front view of the fan showing the fan plenum chamber partly in section.

The second side wall 14, which includes plenum chamber side wall 17d, of the chassis 10 is generally comprised of a sheet of aluminum which is attached to the front wall 11 and the rear wall 12 in a known manner. The rear wall 14 houses within the area shown by dotted lines 18 the system board for the computer. The system board 18 is the main printed circuit board and contains the electronic circuitry for the central processing unit of the computer. In the illustration of FIG. 2, the system board 18 is illustrated as being oriented in a vertical position and is attached to the second side wall 14 for the tower unit chassis 10. The rear wall 12 for the computer tower unit chassis includes a recessed wall portion 12a having a series of horizontally directed slots 12b which allows air circulated through the internal area of the computer to be directed outwardly of the chassis 10.

The rear wall 12 further includes a U-shaped, recessed rack 20 which is provided for mounting one or more of a series of processor cards or card extenders supporting processor cards. The rack 20 is of a type generally known in the industry and includes a first inwardly extending shoulder portion 20a, a series of slots 20b and a second inwardly extending shoulder portion 20c. There are a plurality of openings in the vertically extending shoulder portion of flange 20a which receive mounting screws 21 to mount the card extenders as hereinafter described.

A plurality of horizontally extending shelf supports generally designated as 22 are attached to the inside face of a partition 17e to mount the other side of the card extenders.

The card extender unit C-1 is provided to mount printed circuit board 30 in the horizontal position in internal space S illustrated in the drawings and further to provide for directing the flow of circulating air across the electronic components mounted on the printed circuit board for cooling them. The printed circuit board 30 of the card extender unit C-1 includes one or more high wattage, integrated circuits 30a. The high wattage, integrated circuits such as 30a may be any type of integrated circuits which utilize relatively high power and thus attain high operating temperatures. In the embodiment illustrated, the integrated circuit is a Pentium manufactured by Intel Corporation. The Pentium includes a heat sink 30b which is a series of upwardly extending fins to enhance the dissipation of heat from the circuitry.

The card extender C-1 includes a first section 31 which is principally a flat plate portion 31a and includes tabs 31d which are provided to be attached by screws or other means to the printed circuit board 30. The outer end of the plate 31a includes a flanged portion 31b which extends upwardly from the plate portion 31a. The flange 31b includes a right angle connector portion 31c having an opening which is alignable with one of the openings in the rear wall mounting flange 20a to receive a screw 21 to mount the card extender. The other end of the flange 31b is insertable into a suitable slot provided for mounting such card extenders as is well known in the art.

The card extender C-1 further includes a second housing section 32 also attached to the printed circuit board 30. The second housing section 32 includes a generally rectangular channel or duct section generally designated as D-1. The generally rectangular duct section D-1 is formed by a top wall member 32a, side walls 32b and 32c and a bottom wall 32d which may be interconnected for form a generally rectangular duct. The channel or duct section D-1 is positioned adjacent to openings in the internal partition 22 of the plenum chamber C in order to receive air circulated by the fan unit 15 and direct such air across the upwardly extending fins of heat sink 30b of the integrated circuit 30a. The top plate 32 actually extends from the channel or duct portion D-1 outwardly over the top of the integrated circuit 30a in order to further confine circulating air to pass through the fins of heat sink 30b. The air flow is further confined by a card extender side flange 32b' which is an extension of the channel side 32b. While these various sides and faces have been described separately, it is understood that it may be commercially desirable to manufacture the entire first and second card extender sections 31 and 32 from a single metal sheet.

The bottom wall 32d of the channel portion of the second housing section of the card extender includes one or more tabbed members similar to tab member 31d for connecting the second card extender housing section 32 to the printed circuit board 30. It should be further noted that the channel section 32 directs the circulating air not only across the high wattage, integrated circuits such as 30a but also across the other electronic components on the printed circuit board and further across the systems board 18 as the air is circulated outwardly through the slots 12b in the rear chassis wall 12.

The card extender C-2 is mounted below the card extender C-1 but it should be understood that the card extender C-2 may be used in any position. The card extender C-2 has substantial similarity to the card extender C-1 and thus the same numbers and letters will be used where possible. A printed circuit board also generally designated as 30 is mounted and held in a horizontal position by the card extender housing, which includes a first section 31 and a second section 35. The first section 31 is identical to the same numbered section of the card extender C-1 and thus mounts the printed circuit board 30 similarly as illustrated in FIG. 2 and attaches the printed circuit board 30 in position to the rear wall mounted flange 20a as previously described.

It is the second section 35 of the housing of the card extender C-2 that differs from the second section 32 of the housing for the card extender C-1. The second section 35 for the housing C-2 includes a generally rectangular flow intake section identified generally as D-2 provided by a bottom wall 35a and side walls 35b and 35c. A top wall is provided by top wall section 35e. A movable wall section or baffle 36 includes a generally flat upper portion and downwardly depending side portions which mount by pins such as 37 to the side walls 35b and 35c for pivotal movement. In this manner, the upper moveable plate section 36 is provided as part of the intake channel in order to increase the air intake across the printed circuit board when desirable.

Utilizing the card extender units C-1 and C-2, high wattage, integrated circuits such as 30a can be operated at lower temperatures due to the active circulation provided by the card extenders of this invention.

Having described the invention above, various modifications of the techniques, procedures, material and equipment will be apparent to those in the art. It is intended that all such variations within the scope and spirit of the appended claims be embraced thereby.

We claim:

1. A housing for a computer, including:
   a generally box-like chassis including front and rear walls joined with first and second side walls to form an enclosure to house computer internals including electronic circuitry;
   said chassis including a substantially enclosed plenum chamber formed by said front wall and said first and second side walls externally and one or more internal partitions which cooperate to form said substantially enclosed plenum chamber;

said plenum chamber having a fan mounted therein, said fan circulating air from outside of said chassis into said plenum chamber;

one of said internal partitions having openings therein through which said circulating air flows such that said fan circulated air is drawn from outside said chassis and through said plenum chamber;

a card extender unit mounted within said chassis in position to receive said circulating air, said card extender including a printed circuit board containing electronics including one or more high wattage, integrated circuits, and an extender housing which is attached to said printed circuit board and includes a first section extending into attachment with said rear wall and a second section extending into attachment with said one internal partition having said openings therein through which said circulating air flows; and said second section of said card extender housing including a flow direction channel section for receiving and directing said circulating air over said one or more high powered integrated circuits.

2. The housing of claim 1, including:

said channel section including top, bottom and side walls interconnected to form said flow direction channel, said bottom being attached to said printed circuit board such that circulating air from said plenum chamber flows through said channel section over said printed circuit board and said integrated circuits mounted thereon.

3. The housing of claim 2, including:

said top extending over said printed circuit board and cooperating with said printed circuit board to further direct circulating air from said channel section over said printed circuit board.

4. The housing of claim 3, including:

one of said side walls of said channel section extending with said top over said printed circuit board to cooperate with said top and said printed circuit board to further direct circulating air from said channel section over said printed circuit board.

5. The housing of claim 2, including:

said top wall of said channel section including a movable portion and pivot means mounting said movable portion for pivotal movement to a wider position in order to increase intake area into said channel.

* * * * *